July 22, 1941.    W. F. GROENE ET AL    2,250,097
FEED CONTROL MECHANISM FOR LATHES
Filed July 31, 1940
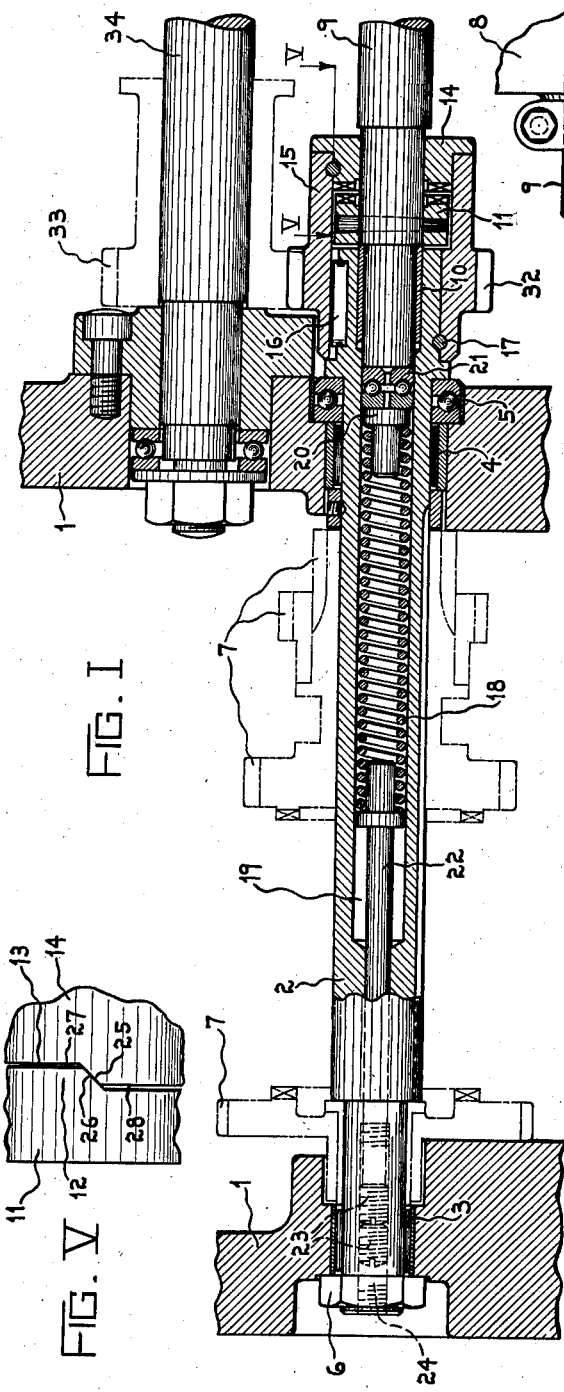
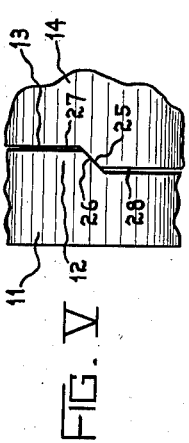
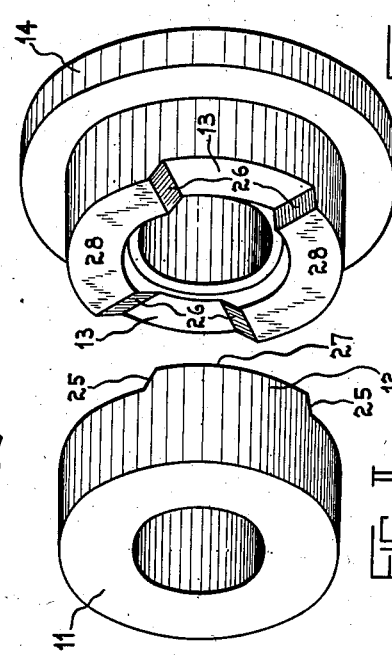
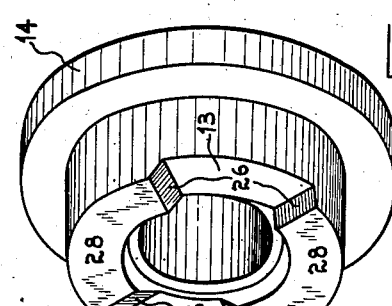
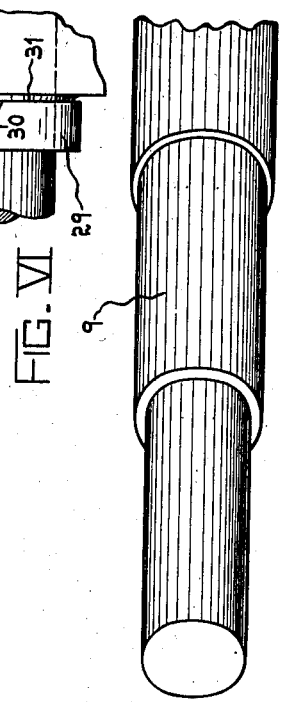
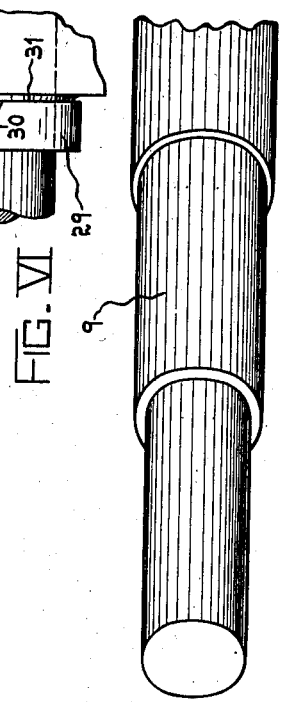
INVENTOR.
WILLIAM F. GROENE
WILLIAM A. KIMSEY
BY Willard S. Groene
ATTORNEY.

Patented July 22, 1941

2,250,097

UNITED STATES PATENT OFFICE 2,250,097

FEED CONTROL MECHANISM FOR LATHES

William F. Groene and William A. Kimsey, Cincinnati, Ohio, assignors to The R. K. Le Blond Machine Tool Company, Cincinnati, Ohio, a corporation of Delaware Application July 31, 1940, Serial No. 348,910

7 Claims. (Cl. 82—21)

This invention pertains to improvements in controlling the feeding mechanism for machine tools and is particularly related to the feed driving mechanism of lathes. More especially this invention is related to the driving of the lathe carriage in feeding motion from the feed box of the lathe having an output drive shaft which drives the feed rod of the lathe through an overload clutch device. Heretofore, such overload clutch devices in such feeding mechanism for lathes has been invariably constructed with spring urged ball members which engage in detents in the member to be driven which was connected to the feed rod of the lathe. The use of such apparatus has been defective because it has been substantially impossible to control the point at which the detent mechanism would begin to function to relieve strain from overload caused in the feed rod and feeding mechanism of the lathe carriage because these balls would set up different indeterminable characteristics of pressure as they would proceed to roll out of the detents which could not be accurately predetermined for each load imposed on the feeding mechanism of the lathe. Furthermore, the space requirements for use of the radially expanding springs for pressing these balls against the detent holes in the detent member connected to the feed rod was limited so that these springs could not be properly proportioned to give the necessary free action and accuracy of control of the movement of the balls out of the detent notches in the feed rod driving member.

It is therefore one of the objects of this invention to provide an overload clutch device having constant characteristics of disengagement so that accurate predetermined pressure can be set up at which the overload device will become effective so as to accurately determine the point at which overload will cause the feeding mechanism power to be disconnected from the feed rod of the lathe feeding mechanism to thereby prevent damage to it should it meet an obstruction during its normal feeding operation.

Another object of this invention is to provide an overload driving connection between the output shaft of the feed box of the lathe and the feed rod of the lathe mounted co-axially with the output shaft of the feed box in such a way that the entire spring mechanism, of relatively large size and easily adjusted to accurate pressure, is self contained within the confines of the output shaft of the feed box.

A still further object of this invention is to provide an overload clutch device between the output shaft of the feed box and the feed rod of the lathe, in which a relatively long spring is utilized to effect the accurate disengagement of the overload clutch member at accurate predetermined conditions of overload and to provide an adjusting means readily accessible at the rear end of the output shaft of the feed box for careful setting of the overload device for the desired predetermined pressures of overload which may be encountered by the lathe carriage mechanism.

Another important object of the present invention is to provide in conjunction with this type of overload clutch device, means for automatically disengaging the feed of the carriage by manipulating the overload clutch device by direct movement of the carriage relative to the feed rod of the lathe.

A still further object of this invention is to provide in a lathe having a feed box and an output shaft in said feed box, an overload clutching device interconnected between said output shaft of said feed box and said feed rod of the lathe which may be rendered operative both by overload imposed upon it by an obstruction encountered by lathe carriage or tool feeding mechanism and also by engagement of the apron of the lathe with an abutment dog on the feed rod so as to shift the feed rod axially thereby effecting operation of the overload clutch device.

Further features and advantages of this invention will appear from the detailed description of the drawing in which:

Figure I is a fragmentary section through a feed box for a lathe particularly showing the output drive shaft of the feed box, the feed rod, the interconnecting overload clutch mechanism between the output shaft and the feed rod, and the lead screw of such lathe.

Figure II is an isometric drawing of the feed rod member of the overload clutch device.

Figure III is an isometric view of the output shaft overload clutch member.

Figure IV is a view showing the configuration of the end of the feed rod to which the overload clutch mechanism is applied.

Figure V is a fragmentary view on the line V—V of Figure I, particularly showing the shape of the angularly related clutch teeth of the overload clutch device.

Figure VI is a fragmentary front view of a portion of a lathe apron showing its relationship to the feed rod and the dog fixed on said feed rod so that its feeding movement longitudinally of the bed effects axial movement in the feed rod when it engages the dog mounted thereon to effect disengagement of the overload clutch device for stopping the feeding of the lathe carriage and apron mechanism.

For illustrative purposes, this invention is shown applied to a conventional engine lathe having a feed box 1 in which is journaled the output shaft 2 on suitable bearings 3 and 4 and journaled against axial movement in the feed box 1 by means of the end thrust bearing 5 and the adjusting collar 6. This output shaft 2 is driven from the lathe headstock transmission (not shown) through suitable gearing 7 so that it may be rotated at the required necessary plurality of predetermined speeds of rotation relative to the spindle rotation of the lathe for effecting the desirable feeding rate for the lathe apron 8, Figure VI, and the tool carriage (not shown).

The feed rod 9 of the lathe is journaled for both rotary and axial movement in the bearing 10 carried in the right hand end of the output shaft 2. Fixed on this feed rod 9 is the overload clutch member 11 having projecting teeth 12 as best shown in Figure II. These teeth 12 are arranged to normally enter in the slotted portions 13 of the clutch member 14 which is fastened to the lead screw driving gear hub 15 which in turn is appropriately mounted by means of the key 16 and pin 17 on the end of the output shaft 2.

The feed rod 9 is normally urged to the right, Figures I and VI, so as to maintain the clutch members 12 and 13 in engagement, as shown in Figure V, by means of the relatively long spring 18 carried in a bore 19 in the output shaft 2 which spring bears against the abutment plunger 20, which in turn engages a thrust bearing 21 contacting the end of the feed rod 9 so as to normally push it to the right, as seen in Figure I. A back up plunger 22 engages the other end of the spring 18 and is held in position in the bore 19 by appropriate set screw adjusting means 23 suitably threaded in the reduced bore 24 formed in the output shaft 2 of the feed box. By means of this adjusting mechanism 23 the compression in the spring 18 may be very accurately adjusted so as to effect an accurate predetermined pressure of the member 11 against the member 14 with relation to the engagement of their respective tongues 12 and slots 13.

It can thus be seen that as excessive load is applied to the feed rod 9 by an obstruction engaged by the tool carriage and the apron of the lathe, the tendency will be to prevent rotation of the feed rod 9 at which time the angular surfaces 25 of the clutch member 11 and surfaces 26 of the clutch member 14 will tend to slide up one another until the respective surfaces 27 of the tongues 12 will come up and ride over on the surfaces 28 of the member 14 so as to permit continued rotation of the output shaft 2 while the shaft 9 is held against rotation by the obtructing means for the feed mechanism of the lathe. This action may continue with the tongues 12 intermittently dropping into the respective slots 13 and again rising up over the surfaces 28 until the obstruction has been removed or until the lathe feeding power applied to the output shaft 2 is stopped thereby preventing any damage whatever to the feed mechanism to the lathe.

An important characteristic and unique feature in conjunction with this device is the utilization of the angularly related clutch faces 25 and 26 which are so positioned that they have substantially no frictional contact during the normal driving action and during the time when the overload takes place in stopping rotation of the feed rod while the output shaft 2 continues to rotate. In this way, a relatively uniform easy disengagement of the overload clutch device automatically takes place without the difficulty of the impossible to determine coefficient of friction playing an active part in the disengagement or re-engagement of the mechanism. It is also to be noted that a relatively long accurately adjustable spring is utilized for maintaining the clutch members 11 and 14 in normal engagement during the regular feeding operation of the lathe feeding mechanism. The clutch teeth surfaces 25 and 26 are so arranged that they normally would easily rise up on one another at the slightest loading of the feed rod 9, however, the spring member 18 is so designed as to take up all of the load short of any excess load which may be imposed on the feed rod 9. In this way, all of the driving action is provided substantially through the compression of the spring 18, so that an extremely sensitive overload arrangement is provided which lends itself adequately and safely to disengagement of relative rotation between the output shaft 2 and the feed rod 9 in the event any obstruction, in excess of that to which it has been accurately set, takes place in the feeding mechanism of the lathe.

Another unique feature in combination with this unique overload clutch device, is an arrangement whereby the relative feeding of the apron 8, in this instance to the left, may cause the overload device to act as a feed trip out mechanism by automatically causing the apron to engage an adjustable trip dog 29, Figure VI, which may be adjusted and clamped along on the feed rod by the surface 30 of the apron 8, as it feeds to the left engaging the surface 31 of the trip dog 29 to axially move the feed rod to the left, Figure I, compressing the spring 18 and thereby disengaging the clutch members 11 and 14 to act as an accurate trip out mechanism for the lathe feed carriage. We have, therefore, with this arrangement, combined the feature of overload driving mechanism for the feed mechanism for the lathe in conjunction with automatic feed trip out mechanism for the lathe carriage.

It will also be noted that a relatively long compression spring 18 is provided well within the confines of the output shaft 2 and feed rod 9 and it will also be noted that there is provided a gear 32 on the hub 15, which engages a suitable gear 33 fixed on the lead screw 34 of the lathe, so that the lead screw may be driven positively in the conventional manner independent of the overload clutch device for the feed rod mechanism of the lathe.

Having thus fully set forth and described our invention what we claim as new and desire to secure by United States Letters Patent, is:

1. In a lathe, a feed box transmission, a tool carriage, means for driving said feed box transmission, means for connecting said transmission to said carriage to actuate it in feeding movement, said connecting means incorporating an overload clutch device, means for rendering said device effective when the movement of said carriage is impeded, and means operated by the movement of said carriage to a predetermined point and acting on said overload clutch device rendering said device effective to disconnect said feed box transmission from said tool carriage.

2. In a lathe, a feed box transmission, a tool carriage, an apron on said carriage, an output shaft in said feed box, a feed rod mounted coaxially with said output shaft, an overload clutch interconnecting said output shaft and said feed rod, means permitting axial movement in said feed rod to render said overload clutch operative, and means whereby the longitudinal movement of said apron along the bed of said lathe effects axial movement of said feed rod.

3. In a lathe, a feed box transmission, a tool carriage, an apron on said carriage, an output shaft in said feed box, a feed rod mounted coaxially with said output shaft, an overload clutch interconnecting said output shaft and said feed rod, comprising a clutch jaw member fixed on said output shaft and a mating clutch jaw member fixed on said feed rod, and means for engaging or disengaging said jaw members by axial movement of said feed rod.

4. In a lathe, a feed box transmission, a tool carriage, an apron on said carriage, an output shaft in said feed box, a feed rod mounted coaxially with said output shaft, an overload clutch interconnecting said output shaft and said feed rod, comprising a clutch jaw member fixed on said output shaft and a mating clutch jaw member fixed on said feed rod, means for engaging or disengaging said jaw members by axial movement of said feed rod, and resilient means acting on said feed rod to normally maintain said jaw members in driving engagement.

5. In a lathe, a feed box transmission, a tool carriage, an apron on said carriage, an output shaft in said feed box, a feed rod mounted coaxially with said output shaft, an overload clutch interconnecting said output shaft and said feed rod, comprising a clutch jaw member fixed on said output shaft and a mating clutch jaw member fixed on said feed rod, means for engaging or disengaging said jaw members by axial movement of said feed rod, and resilient means carried in said output shaft acting on said feed rod to move it axially to maintain said jaw members in driving engagement.

6. In a lathe, a feed box transmission, a tool carriage, an apron on said carriage, an output shaft in said feed box, a feed rod mounted coaxially with said output shaft, an overload clutch interconnecting said output shaft and said feed rod, comprising a clutch jaw member fixed on said output shaft and a mating clutch jaw member fixed on said feed rod, means for engaging or disengaging said jaw members by axial movement of said feed rod, resilient means carried in said output shaft acting on said feed rod to move it axially to maintain said jaw members in driving engagement, and means in said output shaft for accurately adjusting the effectiveness of said resilient means.

7. In a lathe, a feed box transmission, a tool carriage, an apron on said carriage, an output shaft in said feed box, a feed rod mounted coaxially with said output shaft, an overload clutch interconnecting said output shaft and said feed rod, comprising a clutch jaw member fixed on said output shaft and a mating clutch jaw member fixed on said feed rod, means for engaging or disengaging said jaw members by axial movement of said feed rod, resilient means carried in said output shaft acting on said feed rod to move it axially to maintain said jaw members in driving engagement and means for positively driving the lead screw of said lathe from said output shaft independent of said overload clutch mechanism.

WILLIAM F. GROENE.
WILLIAM A. KIMSEY.